April 23, 1968     KEN HASHIMOTO     3,379,831
FLAT SCREEN TELEVISION DISPLAY APPARATUS
Filed March 4, 1965     5 Sheets-Sheet 1

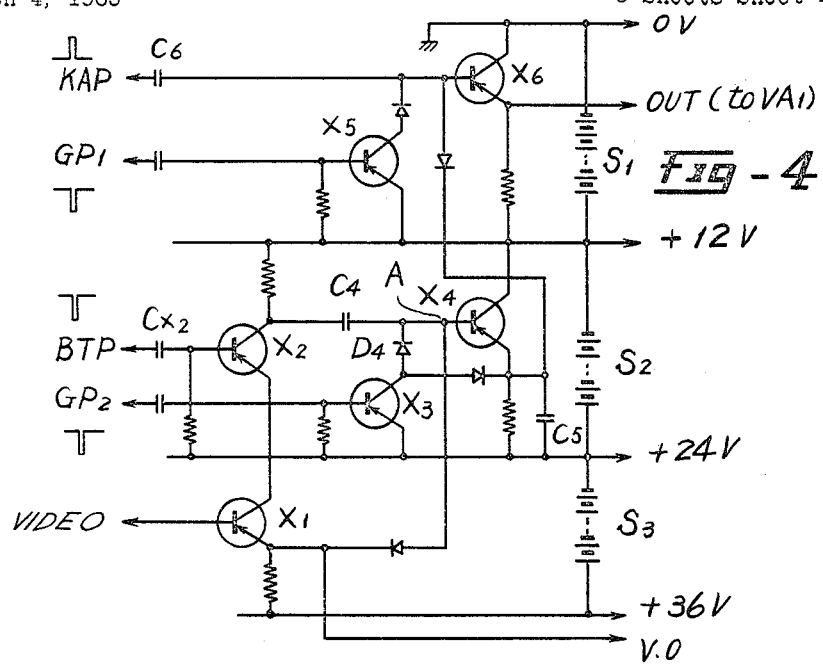
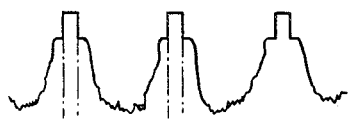
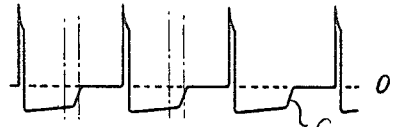
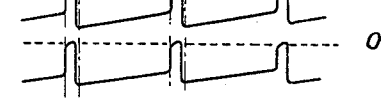

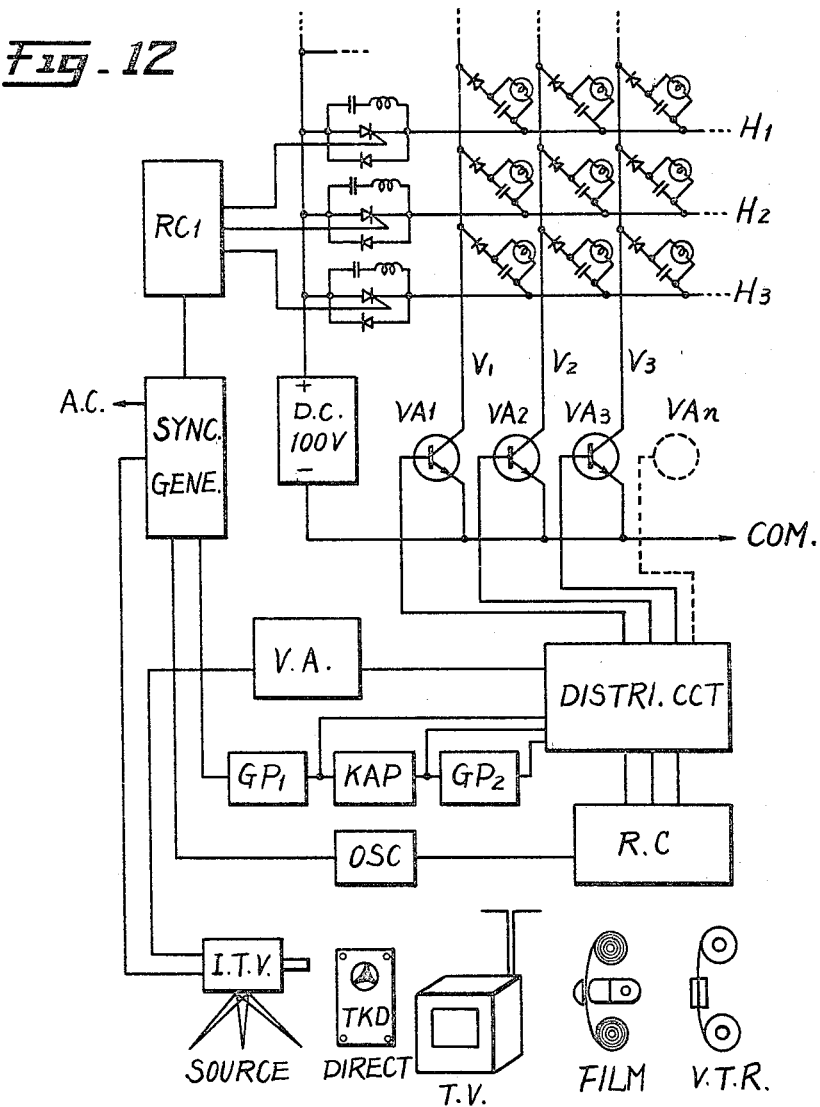

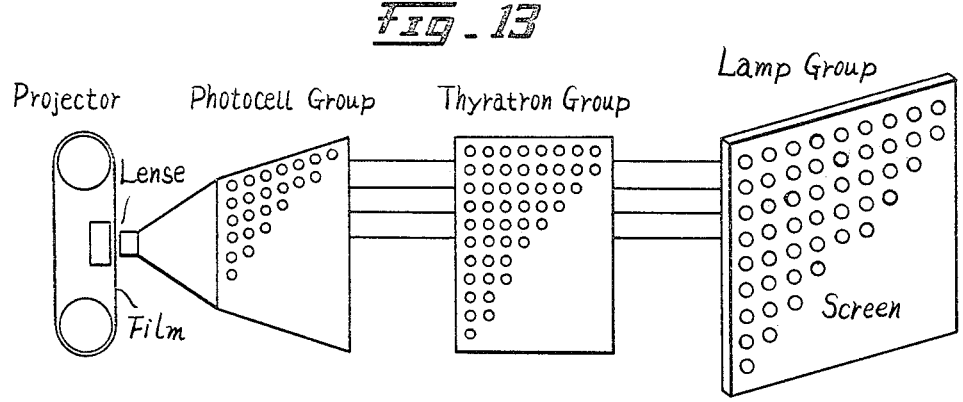
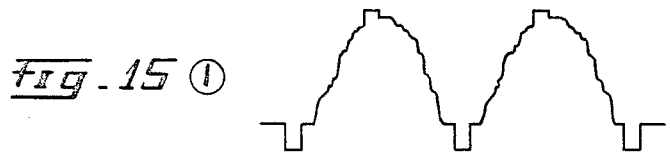
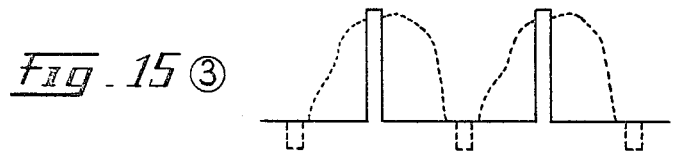

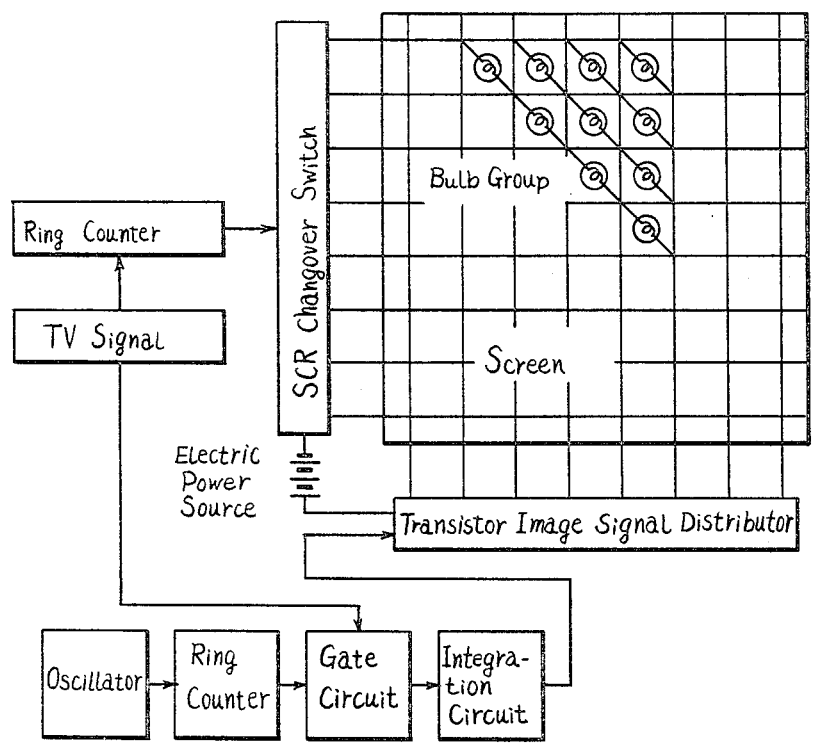

United States Patent Office 3,379,831
Patented Apr. 23, 1968

3,379,831
FLAT SCREEN TELEVISION DISPLAY APPARATUS
Ken Hashimoto, Tokyo, Japan, assignor to Fuji Neon Kabushiki Kaisha, Setagaya-ku, Tokyo, Japan
Filed Mar. 4, 1965, Ser. No. 437,174
Claims priority, application Japan, Mar. 19, 1964, 39/14,982
3 Claims. (Cl. 178—7.3)

ABSTRACT OF THE DISCLOSURE

A wall television device comprising a picture screen consisting of a plurality of picture elements positioned side by side in a plurality of horizontal rows forming elementary horizontal picture lines, the corresponding picture elements in the horizontal rows being vertically aligned in a plurality of side by side vertical rows equal in number to the number of horizontal rows and forming elementary vertical picture lines, said picture elements each comprising a parallel connected electric illumination element and a condenser, and a diode connected in series with the parallel connected illumination element and condenser; an SCR switching device for switching power from horizontal row to horizontal row for scanning, a D.C. power source, a plurality of horizontal and vertical lead wires equal in number to the number of horizontal and vertical rows of picture elements, and a video distribution amplifying circuit, one end of each said picture elements being connected to a horizontal lead wire for the corresponding horizontal row, which in turn is connected to one end of said D.C. power source through said SCR switching device, the other end of each of said picture elements being connected to a vertical lead wire for the corresponding vertical row, which in turn is connected to the video distribution amplifying circuit; said video distribution amplifying circuit being connected to the D.C. power source and including means for retaining a voltage during each horizontal scanning period in accordance with the strength of the video signal.

---

The present invention relates to a wall television device, and more particularly to a wall television device for reproducing TV picture signals on a picture screen formed by a symmetrical arrangement of bulbs.

The so-called moving picture sign that has hitherto been in use is so composed, as shown in the appended drawings, that a black-and-white silhouette film is projected by a 16 mm. projector onto a screen which is formed by an arrangement of photocells of a headon type (the light entering from the top), the output of the said photocells having been connected to the grids of an equivalent number of thyratrons and the plates of said thyratrons having been connected in series with 200 v./AC lamps. Said thyratrons are connected respectively with the lamps forming the screen.

Such a conventional moving picture sign comprising a light receiving part for the picture elements, an amplifier part and the transmission lines, constitutes a most primitive TV device but may be quite ideal, at least in that it requires no scanning since it is almost equivalent to a human eye. However, when this means is actually employed, the cost of construction increases as the size of the picture elements are increased and the device becomes complicated and costly, thus making it uneconomical. In addition, since the device employs thyratrons as mentioned above, it is limited to black and white responses. This is a defect because it is not capable of producing half tones.

The present invention is intended to eliminate the above-described defects of the conventional apparatus and to furnish a superior wall-television device.

In other words, an object of the present invention resides in the possibility of reproducing large size TV pictures by simply employing bulbs without employing a CRT tube, etc. Said CRT tubes are costly and electrically and mechanically complicated.

Another object of the present invention will be effectively realized if and when the present device is available for outdoor or indoor advertising purposes. The present invention will be practically advantageous for such purposes as a wall-television device having a super-large picture screen.

A further object of the present invention will be realized in the form of its very simple apparatus and its remarkably reduced cost inasmuch as pictures may be readily picked up from a TV camera; images may be reproduced freely from motion pictures, actual objects, VTR, TV broadcasts, etc., and it will not be necessary to have as many lead wires to the display device as there are picture elements. In the conventional moving picture sign it is necessary to have the same number of lead wires as picture elements.

The present invention concerns a wall-television device, comprising bulb picture elements, formed by connecting diodes in series with parallel elements comprising bulbs and condensers. A picture screen is formed by horizontally arranging a plurality of said bulb picture elements side by side to form a horizontal picture consisting of elementary lines and by arranging a plural number of horizontal picture elements side by side in perfect order to form a vertical picture consisting of elementary lines. Said picture screen resembles the pattern of section paper and is characterized in that: one end of said bulb picture elements is connected with the horizontal lead wires which are connected with a D.C. power source which successively supplies power in accordance with the horizontal scanning frequency of the TV set; the other end of said bulb picture elements is connected with the vertical lead wires which contain a video-distribution amplifying circuit having a means for retaining the voltage corresponding to one horizontal scanning period in accordance with the intensity of the video signals.

Another embodiment of the present invention involves a wall-television device as described above but employs other luminous elements instead of bulbs and also employs an element for controlling the reflective light or penetrating light by an electric signal.

A further embodiment of the present invention involves a wall-television device as described above but using a SCR for effecting the changeover of the horizontal lines and employing a turning off means for making one horizontal period alone conductive.

A still further embodiment of the present invention involves a video-signal distribution circuit as described above but provided with a means for extracting a picture element out of the video signals at a corresponding time, a means for retaining said video signals during the next horizontal scanning period, and a means for erasing previous picture signals.

These objects of the present invention will be more clearly understood by the following detailed disclosure with reference to the appended drawings, in which:

FIG. 4 is a diagram of a video distribution circuit;

FIG. 5 to FIG. 11 are plots showing the voltage-current wave form of each part of the video distribution circuit in FIG. 4;

FIG. 12 is a block diagram illustrating the principle of the present invention;

FIG. 13 is a block diagram showing the principle of a conventional cinesign;

FIG. 14 is a block diagram illustrating the working principle of the scanning-system TV sign according to the present invention; and FIGS. 15–1 to 15–4 are plots of wave forms illustrating the principle of the video signal distribution circuit of FIG. 14.

Figure 1:
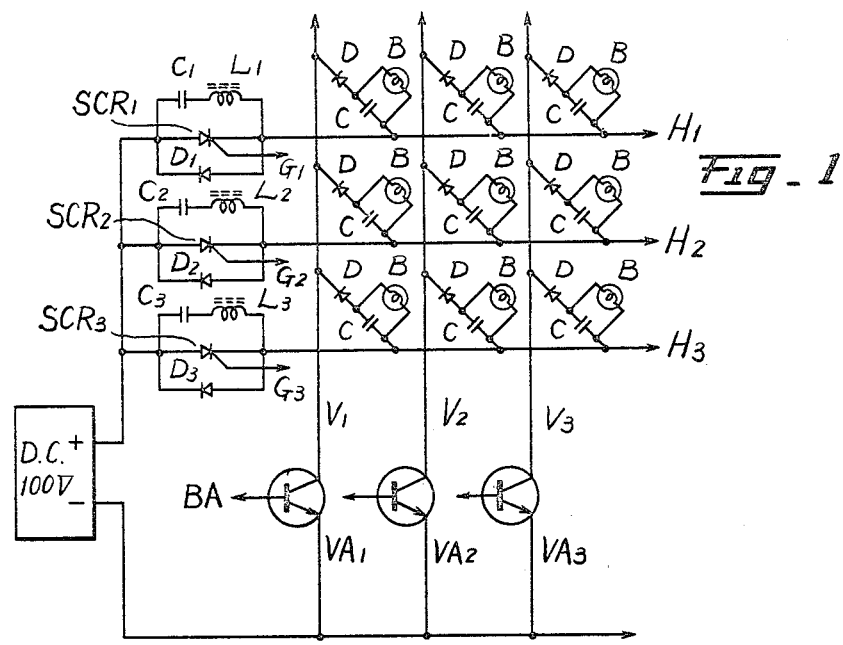
FIG. 1 is a circuit diagram showing a part of the picture screen according to the present invention.

The working principle of the scanning-system TV sign, as shown in FIG. 14, will be described first to facilitate the understanding of the basic idea of the present invention.

In order to scan a number of bulbs arranged in perfect order on a picture screen, conductors are arranged horizontally and vertically like section paper and the bulbs are connected, respectively, with the intersections thereof, as shown in the drawings. The changeover of the power source line from horizontal line to horizontal line is termed a vertical scanning in TV terminology. Said changeover action is carried out by a SCR, and it is only necessary that current be flowing during one horizontal period. In addition, the SCR electronic switch has signals fed to the gate thereof successively by a ring counter, the signal being delivered to one terminal after another as the horizontal signals of the TV.

On the other hand, the vertical lines will not have a signal switched thereto successively by the electronic switch. If the signal for the vertical lines also were switched in the same way as the horizontal lines, the time during which a voltage is applied to one picture element will be too short; e.g., supposing there are 150 vertical lines, the time during which a voltage is applied to one vertical line will be as short as only $\frac{1}{150}$ of the time in which a voltage is applied to one horizontal line, so that it is difficult to apply sufficient electric power to the picture element bulbs.

Figure 2:
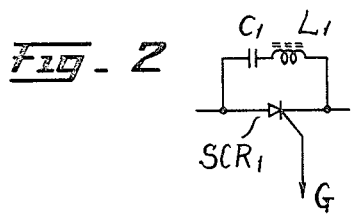
FIG. 2 and FIG. 3 are views of an electronic switching circuit employing silicon controlled rectifier elements (hereinafter abridged as SCR) in the present invention.
Figure 3:
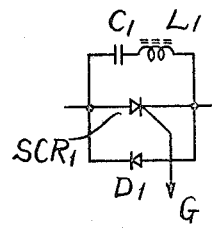

The apparatus is designed so that all the longitudinal lines (vertical lines) are energized during each horizontal period. By way of compensation, there is provided under each vertical line a video signal distribution circuit which sends a current proportional to the video signal corresponding to the bulb position at the intersection of said vertical lines and horizontal lines during the horizontal period; this principle is shown in FIG. 15. FIG. 15–1 shows an extraction gate pulse being fed to a video signal in order to extract the signal corresponding to each vertical line out of the said video signal. In FIG. 15–2 a video signal is sent to the gate circuit through said gate pulse and the video signal shown by the wave form of FIG. 15–3 is extracted. When it is passed through an integral circuit wherein the time constant is approximately equivalent to one horizontal period, it will turn to a signal of the wave form shown in FIG. 15–4. The foregoing actions will take place below the respective vertical lines. (In practice, the circuit employed will be such that it will not only perform integration but it will also retain the video signal during the next horizontal period. This will be described later in detail.) In order to obtain said gate pulse shown in FIG. 15–2, oscillation is started at each horizontal period signal, and the ring counter is driven by the signal of an astable multivibrator that stops oscillation during its flyback period. In this case, the oscillation frequency of the multivibrator will vary according to the resolution but will come to 4MC in the standard system TV.

If an electric circuit is employed in an embodiment according to the basic idea of the present invention as described above, the screen of this invention is formed, as is shown in FIG. 1, by arranging a number of lead wires side by side, horizontally and vertically, like section paper; each intersection therein being connected in series with diodes D and condensers C according to the polarity shown in the drawing, and said condensers C are connected in parallel with the bulbs B to form bulb picture elements, a plurality of which constitute a screen due to the multiple arrangement.

In the synchronous device of the present invention horizontal scanning is carried out by means of electronic switches comprising $SCR_1$, $SCR_2$, $SCR_3$ . . . and video signals, corresponding to the transistors $VA_1$, $VA_2$, $VA_3$ . . . which are connected with the vertical lines V, are applied to said vertical lines while voltages are being applied to the horizontal lines in accordance with the action of said electronic switches. In this case, respective condensers $C_1$, $C_2$, $C_3$ . . . , connected in series with bulbs B through inductors $L_1$, $L_2$ . . . etc., are provided in order to accumulate an electric charge by the time the next scanning is performed. The purpose of this is to prevent flickers from taking place, and to extend the life of the bulbs. Diodes D are provided in order to prevent cross effect (a phenomenon, in which a cross-shaped lighting occurs alongside the intersection points, and not only at the intersection points of the horizontal lines and vertical lines). In FIG. 1, only three vertical lines V and three horizontal lines H are shown, but, in practice there are as many horizontal lines containing SCR's and vertical lines containing transistors VA as there are horizontal scanning lines and vertical scanning lines, respectively, in the screen. These SCR groups are supplied with 100 v. DC voltage from a DC power source, and the gates $G_1$, $G_2$, $G_3$ . . . of the respective SCR's are in turn supplied with horizontal synchronous signals consisting of amplified positive pulses.

The SCR's will be closed only during one horizontal period and when closed, said SCR will feed said DC voltage to the horizontal lines $H_1$, $H_2$, $H_3$ . . . , respectively. The inductors $L_1$, $L_2$, $L_3$ . . . , the condensers $C_1$, $C_2$, $C_3$ . . . and the diodes $D_1$, $D_2$, $D_3$ . . . , which are connected with the SCR's, form a circuit which results in the SCR's being closed during one horizontal period only and opened one horizontal period afterwards.

Figure 2A:
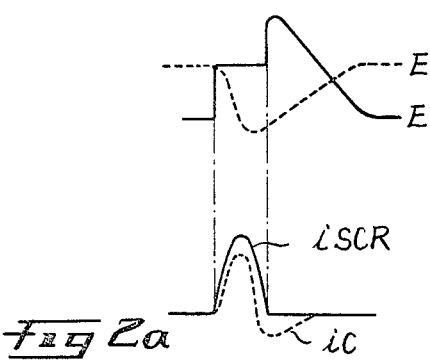
FIG. 2a and FIG. 3a are plots of the voltage-current wave forms of the circiuts of FIG. 2 and FIG. 3.
Figure 3A:
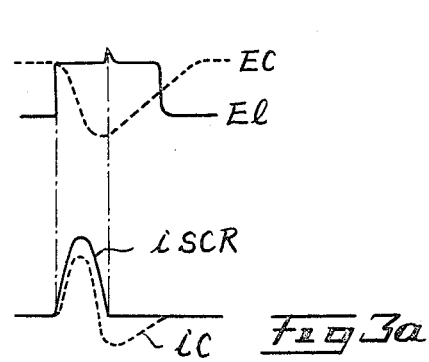

The method of successively switching the horizontal synchronous signals in the present invention employs a ring counter or a flip-flop. A method of rendering the system multioutput by diode matrix is also available, but these are well known techniques which need no detailed description. By having the condensers $C_1$ $C_2$, $C_3$ . . . , the inductors $L_1$, $L_2$, $L_3$ . . . , and the diodes $D_1$, $D_2$, $D_3$ . . . combined to form the well known operation of synchronizing the horizontal signals, said SCR's are closed after their gates have been given horizontal signal pulses, and then they are opened for a certain period (subsequent to one horizontal period). These related actions will now be described in detail. First, while the SCR, which is connected with the 1st horizontal line $H_1$ is open, the condenser $C_1$ is charged by the voltage of the DC power source. Next, the SCR, is excited by a horizontal synchronous signal. Thereupon, a load current $ie$ flows to the load when the resonance circuit comprising the reactor $L_1$ and the condenser $C_1$ is closed by the $SCR_1$. Said oscillation circuit oscillates freely and its resonance current $ie$ combines with the load current $ie$ and flows to $SCR_1$. Since the polarity of said oscillation current $ie$ is inverted one half cycle after the free oscillation, the SCR's will arrive at a turnoff state when the condition is reached where the oscillation current $ie$ plus the load current $ie \leq 0$. That is to say, after a restoring current has flowed, the SCR's restore negative resistance and, therefore, no current flows and the electric charge of the condenser $C_1$ discharges through the reactance $L_1$ and the load, so that it follows that in the meantime inverse voltage will be applied to the SCR's. The corresponding voltage and current wave forms are shown in FIG. 2a and FIG. 3a; FIG. 2a represents the case where diode $D_1$ has not been connected. In this case a sharp rise in voltage $E_1$ will be produced and the wave skirt will be extended. As shown in FIG. 3a, when the diode $D_1$ is connected, the voltage rise will be clipped, and the back voltage period of the SCR's will be determined principally by the inductor $L_1$ and the condenser $C_1$, and the pulse duration will not vary with load resistance. The latter is a great convenience. For example, to set the pulse duration at 200 μsec. when the horizontal frequency is 5 kc., it is recommended that a MP (metallized paper condenser) of about 60 μf. be used for condenser C. The ferrite core of said inductor L have about 18 wrappings of an enamel wire of 1.5 mm. diameter and a core gap of about 0.3 mm. In addition, in this case, a 2SF75 can be used as the SCR and a S2A20 as the diode (both made by Shindengen Co., Japan).

Video signals should be distributed through the vertical-line video-output transistors $VA_1$, $VA_2$, $VA_3$ . . . while pulses are being applied to the respective horizontal lines in such a way as to have currents proportional to the video signals flowing at the positions corresponding to respective picture elements.

Now the distribution action of the video signals of the present invention will be illustrated with reference to the video signal distribution circuit, shown in FIG. 4. This circuit handles the distribution of currents proportional to the strength of the signals of the video picture elements during the conduction period of the coresponding horizontal-line SCR's, to the vertical lines $V_1$, $V_2$, $V_3$ . . . of the screen composed of the plurality of bulbs arranged side by side. The power source of said circuit is, as shown in the drawing, in three sections, $S_1$, $S_2$ and $S_3$, the total voltage amounting to 36 v. if the power-source voltage of each section is 12 v. The third stage $S_3$ will be for the final-stage emitter follower of a video-signal amplifier, its output V.O. having been connected in parallel with the output of other distribution circuits. The video points are supplied with the video signals, and FIG. 5 shows a sample wave form which represents a horizontal scanning period.

As many video signal distribution circuits are needed in the present invention as there are vertical lines, yet video signals must be extracted at their corresponding periods, and therefore pick-up pulses are generated, as shown in FIG. 6, by a ring counter RC (see FIG. 12) at the extraction time, and are applied to the BTP points so as to be applied to the base of the transistor $X_2$, as seen in FIG. 4. Said pick-up pulses are amplified by the transistor $X_2$ and are converted to positive pulses of about 12 v. amplitude, as shown in FIG. 7, and then pass to the collector side of the said transistor $X_2$. The pulses shown in FIG. 7 are applied to the base point A of the transistor $X_4$. Said pulses have a +36 v. peak imposed on a +24 v. signal and will soon restore itself back to the original position. At this point, the diode $D_4$ will become conductive and a voltage, proportional to the video signals V.O., will be extracted from it to charge the condenser $C_4$. The wave form of the base A point of the transistor $X_4$ is shown in FIG. 8. Thus, the voltage charged to the condenser $C_4$ is imparted to the emitter condenser $C_5$ which is connected with the transistor $X_4$, which constitutes the emitter follower circuit. In other words, said emitter condenser $C_5$ is given the voltage extracted from the video signals by the pick-up pulses. A positive 12 v. pulse is imparted to the KAP points at the end of one horizontal period because the lifting pulses lift the voltage of said emitter condenser $C_5$ up to the point of the condenser $C_6$. The voltage of the condenser $C_6$, as shown in FIG. 9, is represented by a voltage wave form, as shown in FIG. 10, which voltage is supplied to the base of the transistor $X_6$ which constitutes the emitter follower. Moreover, if and when said voltage is phase-inverted and is imparted to the base BA of the video-output transistor VA (FIG. 1), the bulb of each picture element will be luminous with the corresponding intensity.

The transistor $X_5$ and the transistor $X_3$ are designed and provided for discharging the charge of the previous period; first of all, the base of the transistor $X_5$ is supplied with the cleaning up pulse $GP_1$ having the wave form shown in FIG. 11 so as to discharge totally the charge of the former period; this is what corersponds to the $G_1$ wave form in FIG. 9. Thereafter the charge of the condenser $C_5$ is raised by the lifting pulse KAP. It is required to have discharged the charge on the condensers $C_4$ and $C_5$, after the charge of said condenser $C_5$ has been raised to the condenser $C_6$. Therefore, a second cleaning up pulse is applied to $GP_2$ in order to discharge it; this is the wave form corresponding to $G_2$ in FIG. 8. FIG. 11 is the wave form showing the time relationship between said first cleaning up pulse $GP_1$, said lifting pulse KAP, and said cleaning up pulse $GP_2$. Said wave form will terminate within the horizontal retrace period and will disappear. The pick-up pulse in FIG. 6 will extract video signals during the horizontal scanning period up to the first cleaning up pulse $GP_1$ and subsequent to the second cleaning up pulse $GP_2$ in the place corresponding to the picture element. Thus, a lifting circuit, maintaining the voltage of a certain height, is to take shape during a following horizontal period after the video signal has been extracted.

The block diagram of FIG. 12 shows the comprehensive, functional relationship between the various components of the present invention. A TV camera ITV is controlled by a synchronous signal generator SYNC. GENE. To forestall various troubles which are probable, it is desirable that the power source by synchronous and therefore power-source synchronizing signals can be taken from the AC line.

Systems are often employed in the present wall television device other than the standard system for TV broadcasting, for example, a power-source synchronizing system using 100 scanning lines, a 5 kc. horizontal scanning frequency, and a factor of 50 fields per second. Accordingly, when TV broadcasting is supplied to the screen, a system conversion may be simply carried out if it is arranged that the picture tube of a separate image-receiving TV set is picked up by ITV. In this case, it is preferable that the phosphor of the picture tube is made of material having a longer afterglow such as green zinc silicate so that the picture tube will be flicker-proof. When horizontal synchronous signals are picked out of the synchronous signal generator SYNC. GENE. and horizontal pulses are successively imparted to the gates of SCR1, SCR2, SCR3 . . . which work as electronic switches through the ring counter $RC_1$, the power source will successively be applied to the horizontal lines $H_1$, $H_2$, $H_3$. . . . With respect to the action of the electronic switches using said SCR's, this has been described above. In the meantime, an oscillator OSC oscillating at a frequency corresponding to the number of horizontal picture elements is driven for each horizontal synchronous signal, and this output is successively distributed to the horizontal picture elements by the ring counter RC, so that pick-up pulses are imparted to the aforementioned video-signal distribution circuit DISTRI. CCT. that is, they are in turn, applied to the output obtained by amplifying the output from the ITV TV camera with a video amplifier VA. From the horizontal synchronous signals of the synchronous signal generator SYNC. GENE. are produced, respectively, the cleaning up pulse $GP_1$, the lifting pulse KAP, and the cleaning up pulse $GP_2$, each respectively produced from the horizontal synchronous signals of the synchronous signal generator SYNC. GENE. through their monostable multivibrator, and amplified to be applied to the distribution circuit DISTRI. CCT.

As indicated by the foregoing disclosure, the present invention can reproduce pictures by sending video signals such as TV signals onto said screen comprised of bulbs arranged side by side, lengthwise and crosswise in perfect order.

The foregoing embodiment of the present invention has employed bulbs as picture elements although it is not limited to bulbs alone but in practice it may be utilized in any wall-television device using brightness-controllable fluorescent lamps such as grid-controlled discharge tubes which have been coated with a fluorescent paint, light valves of the type which move the diaphragm according to the principle similar to that of a moving-coil-type ammeter, light valves composed of a deflecting plate, ADP, KDP and polaroid filter, etc.

What is claimed is:

1. A wall television device comprising a picture screen consisting of a plurality of picture elements positioned side by side in a plurality of horizontal rows forming elementary horizontal picture lines, the corresponding picture elements in the horizontal rows being vertically aligned in a plurality of side by side vertical rows equal in number to the number of horizontal rows and forming elementary vertical picture lines, said picture elements each comprising a parallel connected electric illumination element and a condenser, and a diode connected in series with the parallel connected illumination element and condenser; SCR switching means for switching power from horizontal row to horizontal row for scanning, a D.C. power source, a plurality of horizontal and vertical lead wires equal in number to the number of horizontal and vertical rows of picture elements, and a video distribution amplifying circuit; one end of each of said picture elements being connected to a horizontal lead wire for the corresponding horizontal row, which in turn is connected to one end of said D.C. power source through said SCR switching means, the other end of each of said picture elements being connected to a vertical lead wire for the corresponding vertical row, which in turn is connected to the video distribution amplifying circuit; said video distribution amplifying circuit being connected to the D.C. power source and including means for retaining a voltage during each horizontal scanning period in accordance with the strength of the video signal.

2. A wall television device as claimed in claim 1 in which said illumination elements are incandescent bulbs.

3. A wall television device as claimed in claim 1 in which said video signal distribution circuit includes means for extracting a picture element from a video signal at a particular time, a means for retaining said video signals during the next horizontal scanning period, and a means for erasing previous video signals.

References Cited

UNITED STATES PATENTS

| | | |
|---|---|---|
| 2,002,937 | 5/1935 | Dowsett. |
| 2,136,442 | 11/1938 | Karolus. |
| 2,992,364 | 7/1961 | Rasmussen. |
| 3,263,225 | 7/1966 | Headle. |

OTHER REFERENCES

Ge. SCR Manual, Mar. 23, 1964, pp. 122–124.

ROBERT L. GRIFFIN, *Primary Examiner.*

JOHN W. CALDWELL, *Examiner.*

R. L. RICHARDSON, *Assistant Examiner.*